United States Patent
Williams et al.

[11] Patent Number: 5,852,915
[45] Date of Patent: Dec. 29, 1998

[54] METHOD OF MAKING COMPACT DISC PRODUCT

[75] Inventors: Bruce Williams, Round Lake; David Deschryver, Hainesville, both of Ill.

[73] Assignee: R. R. Donnelley & Sons Company, Chicago, Ill.

[21] Appl. No.: 721,237

[22] Filed: Sep. 26, 1996

[51] Int. Cl.$^6$ ............................................. B65B 61/02
[52] U.S. Cl. ................................ 53/411; 53/452; 53/456
[58] Field of Search ............................... 53/411, 450, 452, 53/456, 461, 462, 464, 476, 449, 254; 493/55, 62, 63, 73, 74, 75, 76, 78, 79, 222, 224, 228

[56] References Cited

U.S. PATENT DOCUMENTS

| | | | |
|---|---|---|---|
| 2,175,338 | 10/1939 | Booth | 226/84 |
| 3,072,519 | 1/1963 | Salzman | 156/200 |
| 3,159,273 | 12/1964 | Schecterson et al. | 206/45.19 |
| 3,594,976 | 7/1971 | Jackson | 53/31 |
| 3,662,511 | 5/1972 | Eliasberg | 53/14 |
| 4,268,261 | 5/1981 | Kohmann et al. | 493/231 |
| 4,300,331 | 11/1981 | Yoshiba | 53/573 |
| 4,304,328 | 12/1981 | Pilat | 206/45.19 |
| 4,320,839 | 3/1982 | Skaggs | 206/591 |
| 4,617,081 | 10/1986 | Bleau et al. | 156/443 |
| 4,623,062 | 11/1986 | Chase et al. | 53/452 |
| 4,627,829 | 12/1986 | Brady, Jr. et al. | 493/189 |
| 4,630,427 | 12/1986 | Harper et al. | 53/462 |
| 4,667,819 | 5/1987 | Lu | 206/312 |
| 4,709,812 | 12/1987 | Kosterka | 206/310 |
| 4,733,519 | 3/1988 | Harper et al. | 53/456 |
| 4,939,888 | 7/1990 | Katz et al. | 53/411 |
| 4,992,128 | 2/1991 | Sellar et al. | 493/228 |
| 5,076,432 | 12/1991 | Wolf et al. | 206/449 |
| 5,078,268 | 1/1992 | Olson et al. | 206/232 |
| 5,085,318 | 2/1992 | Leverick | 206/312 |
| 5,088,599 | 2/1992 | Mahler | 206/313 |
| 5,090,561 | 2/1992 | Spector | 206/308.1 |
| 5,101,973 | 4/1992 | Martinez | 206/312 |
| 5,137,304 | 8/1992 | Silverschotz et al. | 53/411 |
| 5,154,284 | 10/1992 | Starkey | 206/311 |
| 5,155,973 | 10/1992 | Hipko et al. | 53/452 |
| 5,186,327 | 2/1993 | McCafferty et al. | 206/313 |
| 5,188,229 | 2/1993 | Bernstein | 206/312 |
| 5,233,812 | 8/1993 | Coppola | 53/411 |
| 5,242,049 | 9/1993 | Mizuno et al. | 206/313 |
| 5,248,032 | 9/1993 | Sheu et al. | 206/312 |
| 5,279,097 | 1/1994 | Weisburn et al. | 53/449 |
| 5,285,620 | 2/1994 | Kaye et al. | 53/468 |
| 5,289,918 | 3/1994 | Dobias et al. | 206/312 |
| 5,410,857 | 5/1995 | Utley | 493/222 |
| 5,419,433 | 5/1995 | Harrer et al. | 206/313 |
| 5,450,953 | 9/1995 | Reisman | 53/462 |
| 5,460,265 | 10/1995 | Kiolbasa | 206/312 |
| 5,469,965 | 11/1995 | Stearns | 206/588 |
| 5,518,488 | 5/1996 | Schluger | 493/79 |
| 5,522,500 | 6/1996 | Mori | 206/308.1 |

FOREIGN PATENT DOCUMENTS

| | | | |
|---|---|---|---|
| Wo 93/174533 | 9/1993 | WIPO | 206/308.1 |
| WO 93/21086 | 10/1993 | WIPO | 206/312 |

*Primary Examiner*—John Sipos
*Assistant Examiner*—Ed Tolan
*Attorney, Agent, or Firm*—Marshall, O'Toole, Gerstein, Murray & Borun

[57] ABSTRACT

A method of manufacturing a compact disc product having a compact disc and a package which encloses the compact disc which includes the steps of providing a first web of material and a second web of material, positioning a compact disc at a predetermined point relative to one of the webs of material, bonding the webs of material together in a predetermined positional relationship with the compact disc disposed between the webs of material to form a product web, and cutting the product web at a first point adjacent a first side of the compact disc and at a second point adjacent a second side of the compact disc to form the compact disc product.

16 Claims, 3 Drawing Sheets

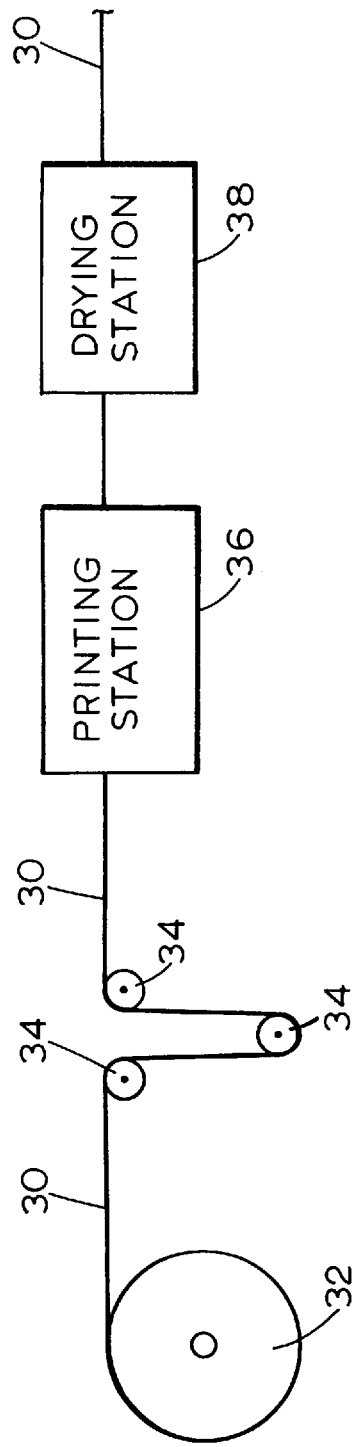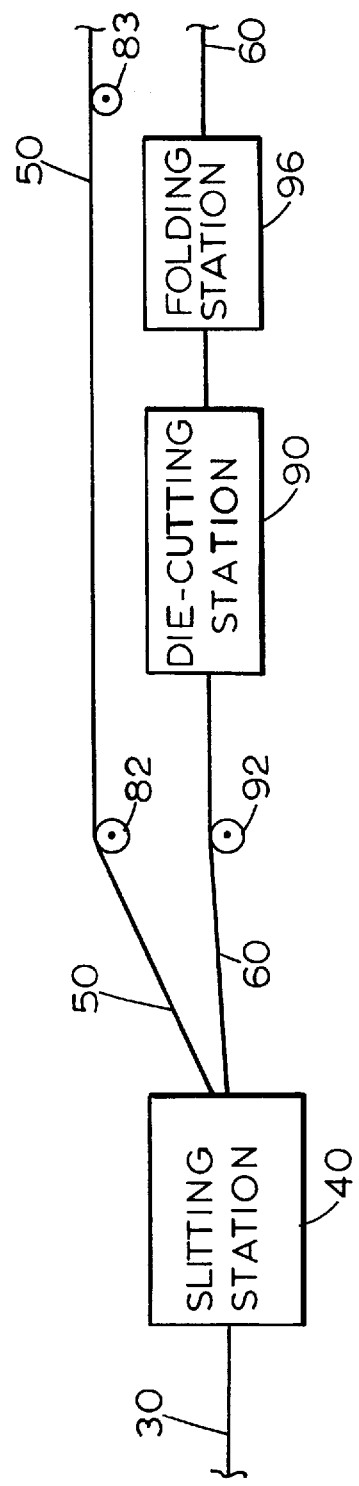
FIG. 3A
FIG. 3B

METHOD OF MAKING COMPACT DISC PRODUCT

BACKGROUND OF THE INVENTION

The present invention is directed to a method of making a data disk product composed of a data disk, such as a compact disc, and a package which encloses the compact disc.

Various types of packages are used or have been proposed to store compact discs. A conventional package for a compact disc is typically composed of a plastic case having a front panel and a rear panel which are hinged together and a plastic insert anchored to the rear panel. The plastic insert has an annular recess formed therein to accommodate a compact disc and a central retaining member which is adapted to be disposed within the central circular aperture of a compact disc to hold the disc in place within the plastic case. Such plastic compact disc cases are relatively expensive to manufacture, are easily scratched, and may be broken.

U.S. Pat. No. 5,085,318 to Leverick discloses a compact disc package formed of a single sheet of card stock which has three panels integrally connected together and separated by a pair of fold lines. One of the panels, which has a semicircular aperture formed therein to accommodate the insertion of a compact disc, is glued to another of the panels, and the third panel may act as a cover panel.

U.S. Pat. No. 5,101,973 to Martinez discloses a compact disc case, formed from a single sheet of cardboard, having a rear panel, a front panel integrally connected to the rear panel, and a cover panel integrally connected to the rear panel. The front panel has two side flaps which, when folded over and connected to the rear panel, help retain the compact disc between the front and rear panels. The front panel of the Martinez compact disc case also has a slot which is adapted to receive a tab on the cover panel to maintain the cover panel in a closed position.

SUMMARY OF THE INVENTION

The invention is directed to a method of manufacturing a data disk product having a data disk and a package which encloses the data disk. The method includes the steps of (a) providing a first web of material and a second web of material, (b) positioning a data disk at a predetermined point relative to one of the webs of material, (c) bonding the webs of material together in a predetermined positional relationship with the data disk disposed between the webs of material to form a product web, and (d) cutting the product web at a first point adjacent a first side of the data disk and at a second point adjacent a second side of the data disk to form the data disk product.

Step (a) may include the steps of providing a main web of material and forming the first and second webs by slitting the main web of material in a longitudinal direction parallel to the length of the main web. Step (c) may include the steps of applying an adhesive to one of the webs, orienting the webs so that the adhesive is disposed between the webs, and applying pressure to the webs to force the webs together.

The method may also include the step of printing a pattern of repeating images on one of the webs of material, forming a pattern repeating die cuts in one of the webs of material prior to step (c), each of the die cuts resulting in the formation of an opening, and folding the web of material after the openings are formed therein.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIGS. 3A–3C illustrate a method of producing the compact disc product;

DETAILED DESCRIPTION OF A PREFERRED EMBODIMENT

Figure 1:
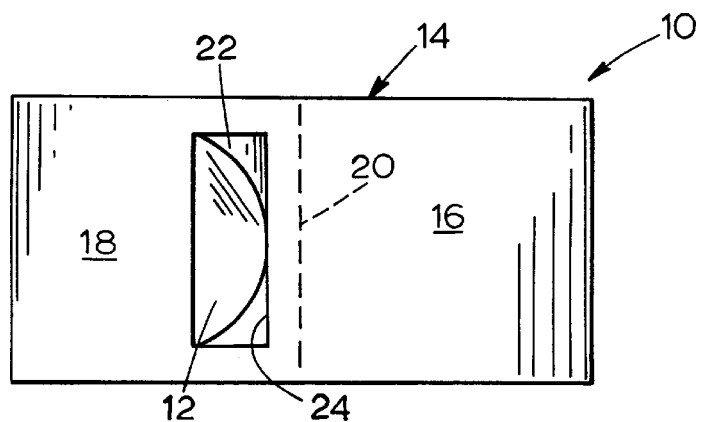
FIG. 1 illustrates a preferred embodiment of a compact disc product in accordance with the invention.
Figure 2:
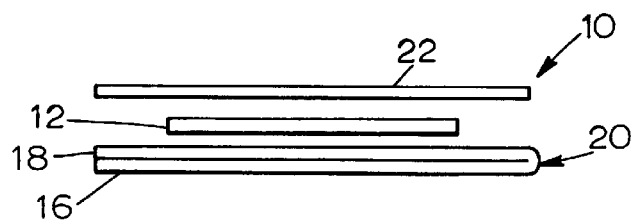
FIG. 2 is an exploded assembly view of the constituent components of the compact disc product of FIG. 1.

FIG. 1 illustrates a compact disc product 10 made in accordance with the invention, and FIG. 2 is an exploded assembly view of the constituent components of the compact disc product of FIG. 1. Referring to those figures, the compact disc product 10 is composed of a compact disc 12, such as a CD-ROM, and a package 14 which encloses the compact disc 12. The package 14 has a cover 16 that is pivotally connected to a retainer panel 18 via a fold formed along a perforation 20. The retainer panel 18 is permanently adhered to a back panel 22 so as to retain the compact disc 12 between the back panel 22 and the retainer panel 18. The retainer panel 18 has a rectangular opening 24 formed therein through which the compact disc 12 may be removed and inserted. The cover 16, the retainer panel 18 and the back panel 22 of the package 14 may be composed of relatively stiff paper, such as cardboard, and may have the usual text and color images printed thereon which relate to the compact disc 12.

Figure 3C:
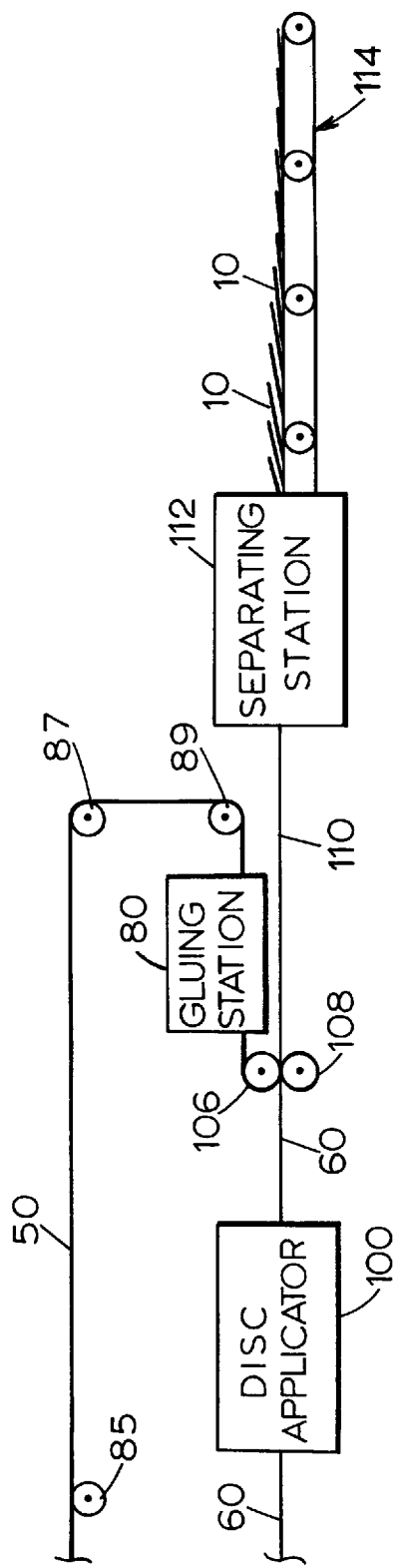

FIGS. 3A–3C illustrate a preferred method of manufacturing the compact disc product 10. The compact disc product 10 is made by a completely automated, continuous process. Referring to FIG. 3A, a main web 30 of material, such as relatively stiff paper or cardboard, is continuously conveyed from a supply roll 32 past a number of support rollers 34 to a conventional multi-color printing press or station 36 where the desired text and images are printed on the main web 30 in a repeating fashion, and to a conventional drying station 38 where the ink applied at the printing station 36 is dried before further processing of the main web 30. Alternatively, the main web 30 of material may be pre-printed with the desired text and images, in which case the printing and drying stations 36, 38 are unnecessary.

Figure 4:
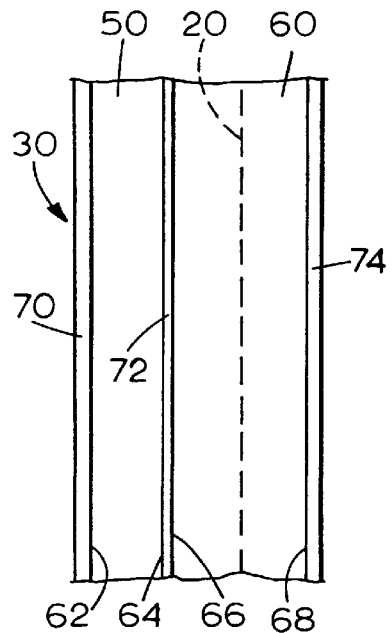
FIG. 4 illustrates a main material web from which the package portion of the compact disc product is formed.

Referring to FIG. 3B, the main web 30 is conveyed to a slitting station 40 where the main web 30 is continuously slit in a longitudinal direction parallel to the length of the main web 30 to form two separate webs 50, 60. Referring to FIG. 4, the slitting station 40 may form four continuous longitudinal cuts 62, 64, 66, 68 in the main web 30 to form the webs 50, 60 and three waste web portions 70, 72, 74 which are discarded. The slitting station 40 also forms a continuous perforation 20 which corresponds to the fold 20 described above in connection with FIG. 1.

Figure 5:
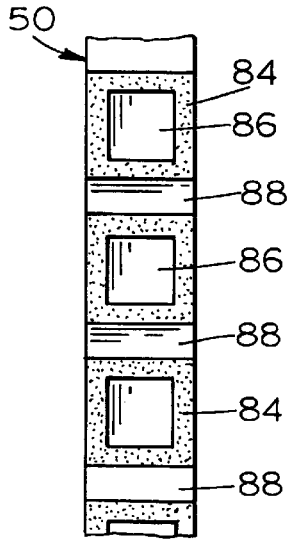
FIG. 5 illustrates a material web that is cut from the main material web of FIG. 4 during the formation of the compact disc package.

From the slitting station 40, the web 50 is conveyed to a gluing station 80, shown in FIG. 3C, via a plurality of rollers 82, 83, 85, 87, 89. The gluing station 80 applies a repeating pattern of adhesive to the upper surface of the web 50 as it passes through the gluing station 80. Referring to FIG. 5, the repeating pattern consists of a plurality of square adhesive areas 84 each of which has a square internal area 86 in which no adhesive is applied. The adhesive areas 84 are sized to substantially correspond to the outer periphery of the square back panel 22 shown in FIGS. 1 and 2. The adhesive areas 84 are spaced apart to leave a plurality of rectangular areas 88 in which no adhesive is applied.

Figure 6:
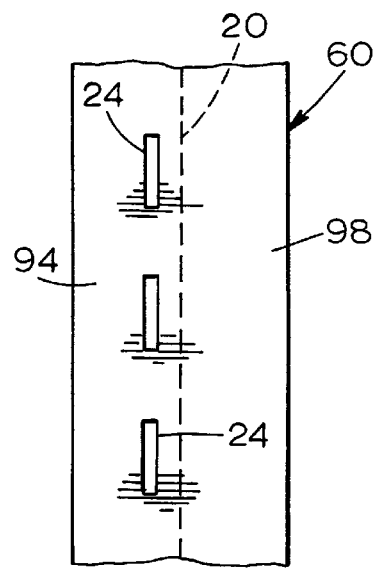
FIG. 6 illustrates a material web that is cut from the main material web of FIG. 4 during the formation of the compact disc package.

Referring back to FIG. 3B, the web 60 passes from the slitting station 40 to a die-cutting station 90 via a lower roller 92. The die-cutting station 90 forms a repeating pattern of die cuts in one side 94 of the web 60 to form a plurality of rectangular openings which will ultimately correspond to the openings 24 in the retainer panels 18 of the compact disc products 10. FIG. 6 illustrates the repeating pattern of openings 24 formed in the web 60 at the die-cutting station 90.

The web 60 passes from the die-cutting station 90 to a conventional folding station 96 at which the web 60 is folded in a longitudinal direction parallel to its length along the perforation 20 previously formed at the slitting station 40. The longitudinal fold is made so that the side 94 (FIG. 6) of the web 60 having the rectangular openings 24 is disposed on top of the opposite side 98 of the web 60.

Figure 7:
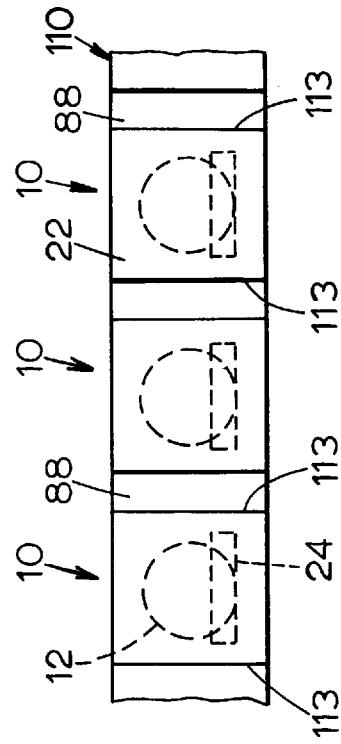
FIG. 7 illustrates a continuous string of compact disc products.

Referring to FIG. 3C, the web 60 passes to a disc applicator 100 which repeatedly places compact discs 12 on top of the side 94 of the web 60, each disc 12 being placed in a predetermined position relative to one of the rectangular openings 24 as illustrated in FIGS. 1 and 7.

The disc applicator 100 may comprise any conventional means for automatically placing the compact discs 12, such as a reciprocating arm (not shown) having a defined stroke which repeatedly pushes a compact disc 12 from a stack of discs to the top surface of the web 60. The rate at which the arm reciprocates is synchronized to the speed at which the web 60 travels, and the time at which the arm begins its stroke is adjustable so that each compact disc 12 is positioned at the correct longitudinal position on the web 60. The rate at which the arm reciprocates could optionally be synchronized with the web speed so that compact discs are placed on the web in their proper longitudinal positions regardless of any variation in the web speed.

Alternatively, instead of being placed by a reciprocating mechanism, the compact discs 12 could be dropped onto the top of the web 60 from a stack of compact discs 12 positioned directly above the web 60. The rate at which the release mechanism is actuated and the time of the release are both adjustable so that each compact disc 12 is dropped onto the correct longitudinal position on the web 60. Although two specific embodiments of the disc applicator 100 are described above, the particular structure of the disc applicator 100 is not considered important to the invention, and any means for automatically placing compact discs on top of the web 60 could be utilized.

After the web 60 with the compact discs 12 placed thereon emerges from the disc applicator 100 at a location directly below the web 50, the web 50 to which the adhesive was previously applied is mated to the top of the web 60. This process is accomplished by orienting the traveling web 50 via a roller 106 so that the top surface of the web 50 to which adhesive was applied is disposed adjacent the top surface of the web 60.

The two rollers 106, 108 exert pressure on the webs 50, 60 so that the webs 50, 60 are bonded together via the adhesive to form a product web 110 having the compact discs disposed between the material webs 50, 60. FIG. 7 illustrates a top view of the product web 110 in which the compact discs 12 are disposed between the webs 50, 60 and in which compact disc products 10 are spaced apart by the rectangular areas 88 described above in connection with FIG. 5.

Referring to FIG. 3C, the product web 110 is provided to a separating station 112 which makes a plurality of lateral cuts 113 (FIG. 7) in the product web 110 to form the individual compact disc products 10. The rectangular areas 88 between adjacent cuts 113 are discarded as waste material. The compact disc products 10 emerge from the separating station 112 in interleaved fashion on a conveyor 114. After the compact disc products 10 are separated at the separating station 112, they could optionally be wrapped with a glassine outer covering in a conventional manner. The products 10 may then be conveyed to a stacker (not shown) or other loading device for placing the products 10 into cartons or other shipping packages.

Figure 8:
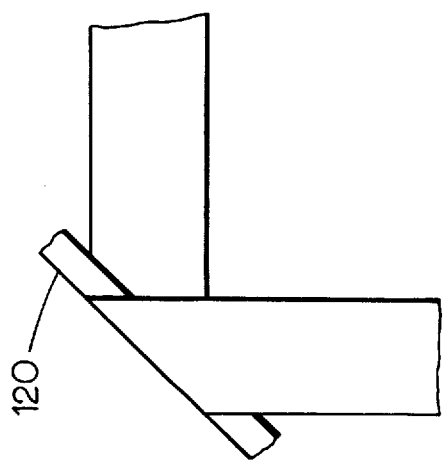
FIG. 8 illustrates the right-angle reorientation of a material web.

The manufacturing line described above for forming the compact disc products 10 can be disposed in a substantially linear direction, or it can have one or more right-angle turns, depending on the shape and size of the area in which the manufacturing line is to be used. Where one or more right-angle turns are incorporated in the manufacturing line prior to the disc applicator 100, either the main web 30 or each of the webs 50, 60 could be reoriented in a perpendicular direction using one or more rollers oriented at a 45° angle to the web, such as the roller 120 shown in FIG. 8.

Although the above method is described in connection with a compact disc 12, other types of disks could be incorporated in the product 10, including any disk that contains data recorded thereon, such as by optical or magnetic recording. For example, where the data disk product 10 contains a floppy disk, both the circular disk of magnetically recordable material and the square plastic case of the floppy disk would be inserted into the package 14 by the disc applicator 100.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A method of manufacturing a data disk product having a data disk with a diameter and a package which encloses said data disk, said method comprising the steps of:

(a) providing a main web of material having a length;

(b) printing a pattern of repeating images on said main web of material;

(c) slitting said main web of material in a longitudinal direction parallel to said length of said main web to provide a first web of material and a second web of material having a length;

(d) applying an adhesive to said first web of material;

(e) forming a pattern of repeating die cuts in said second web of material, each of said die cuts resulting in the formation of an opening in said second web of material;

(f) folding said second web of material in a longitudinal direction parallel to said length of said second web of material to form a folded web, said folded web having a first web portion in which said openings are formed and a second web portion folded over said first web portion at a fold in said longitudinal direction, each of said first and second web portions having a width in a direction perpendicular to said longitudinal direction, each of said widths being at least as great as the diameter of said data disk;

(g) after said step (f), automatically enclosing a data disk between a portion of said folded web and a corresponding portion of said first web and bonding said folded web and said first web to form a product web so that a portion of said data disk is disposed adjacent one of said openings in said first web portion of said folded web; and (h) cutting said product web at a first point adjacent a first side of said data disk and at a second point adjacent a second side of said data disk to form said data disk product.

2. A method as defined in claim 1 wherein said step (g) comprises the steps of:

(g1) automatically placing said data disk on a top surface of said folded web; and (g2) mating said first web of material to said top surface of said folded web so that said data disk is disposed between said first web of material and said folded web.

3. A method as defined in claim 1 wherein said step (g) comprises the steps of:

(g1) automatically placing said data disk on a top surface of said folded web at a predetermined point relative to said one opening in said folded web;

(g2) orienting said first web of material so that said adhesive on said first web of material is disposed adjacent said folded web and in predetermined alignment with said one opening in said folded web; and (g3) mating said first web of material to said top surface of said folded web when said first web of material is in said predetermined alignment by applying pressure to one of said webs to force said webs together.

4. A method as defined in claim 3 wherein said step (g3) comprises the step of applying pressure to one of said webs with a roller.

5. A method of manufacturing a data disk product having a data disk and a package which encloses said data disk, said method comprising the steps of:

(a) providing a first web of material having a length and a second web of material having a length;

(b) applying an adhesive to one of said webs of material;

(c) folding said second web of material in a longitudinal direction parallel to said length of said second web of material to form a folded web of material having a first web portion and a second web portion folded over said first web portion at a fold in said longitudinal direction;

(d) after said step (c), automatically enclosing a data disk between said folded web of material and said first web of material and bonding said folded web and said first web to form a product web; and (e) cutting said product web at a first point adjacent a first side of said data disk and at a second point adjacent a second side of said data disk to form said data disk product.

6. A method as defined in claim 5 additionally comprising the step of forming a pattern of repeating die cuts said second web of material, each of said die cuts resulting in the formation of an opening.

7. A method as defined in claim 5 wherein said step (a) comprises the steps of:

(a1) providing a main web of material having a length;

(a2) forming said first and second webs by slitting said main web of material in a longitudinal direction parallel to said length of said main web.

8. A method as defined in claim 5 wherein said step (d) comprises the steps of:

(d1) automatically placing said data disk on a top surface of said folded web of material; and (d2) mating said first web of material to said top surface of said folded web of material so that said data disk is disposed between said first web of material and said folded web of material.

9. A method as defined in claim 6 wherein said step (d) comprises the steps of:

(d1) automatically placing said data disk on a top surface of said folded web of material at a predetermined point relative to one of said openings in said folded web;

(d2) orienting said first web of material so that adhesive on said first web of material is disposed adjacent said folded web and in predetermined alignment with said one opening in said folded web; and (d3) mating said first web of material to said top surface of said folded web when said first web of material is in said predetermined alignment by applying pressure to one of said webs to force said webs together.

10. A method as defined in claim 5 wherein said step (d) comprises the step of applying pressure to one of said webs with a roller.

11. A method as defined in claim 5 additionally comprising the step of printing a pattern of repeating images on one of said webs of material.

12. A method of manufacturing a data disk product having a data disk and a package which encloses said data disk, said method comprising the steps of:

(a) providing a first web of material having a length and a second web of material having a length;

(b) forming a pattern of repeating die cuts in said second web of material, each of said die cuts resulting in the formation of an opening in said second web of material;

(c) automatically enclosing a data disk between a portion of said second web and a corresponding portion of said first web to form a product web so that a portion of said data disk is disposed adjacent one of said openings in said second web;

(d) bonding said webs of material together in a predetermined positional relationship with said data disk disposed between said webs of material to form a product web; and (e) cutting said product web at a first point adjacent a first side of said data disk and at a second point adjacent a second side of said data disk to form said data disk product.

13. A method as defined in claim 12 wherein said step (a) comprises the steps of:

(a1) providing a main web of material having a length;

(a2) forming said first and second webs by slitting said main web of material in a longitudinal direction parallel to said length of said main web.

14. A method as defined in claim 12 wherein said step (c) comprises the steps of:

(c1) applying an adhesive to one of said first and second webs;

(c2) orienting said first and second webs so that said adhesive is disposed between said first and second webs; and (c3) applying pressure to said first and second webs to force said first and second webs together.

15. A method as defined in claim 12 additionally comprising the step of forming a pattern of repeating die cuts in one of said first and second webs of material prior to said step (c), each of said die cuts resulting in the formation of an opening.

16. A method as defined in claim 12 additionally comprising the step of printing a pattern of repeating images on one of said webs of material.

\* \* \* \* \*